United States Patent
Maltz et al.

(10) Patent No.: US 9,275,448 B2
(45) Date of Patent: Mar. 1, 2016

(54) FLASH/NO-FLASH IMAGING FOR BINARIZATION

(71) Applicant: Xerox Corporation, Norwalk, CT (US)

(72) Inventors: Martin S. Maltz, Rochester, NY (US); Raja Bala, Pittsford, NY (US); Phillip J. Emmett, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/011,028

(22) Filed: Aug. 27, 2013

(65) Prior Publication Data

US 2015/0063720 A1   Mar. 5, 2015

(51) Int. Cl.
*G06K 9/36* (2006.01)
*G06T 5/50* (2006.01)
*G06T 5/00* (2006.01)

(52) U.S. Cl.
CPC . *G06T 5/50* (2013.01); *G06T 5/007* (2013.01); *G06T 2207/20221* (2013.01); *G06T 2207/30176* (2013.01)

(58) Field of Classification Search
CPC .. G06T 5/50; G06T 5/007; G06T 2207/10152
See application file for complete search history.

(56) References Cited

U.S. PATENT DOCUMENTS

| | | | |
|---|---|---|---|
| 6,301,377 B1 * | 10/2001 | Taylor, Jr. | 382/129 |
| 7,619,664 B2 * | 11/2009 | Pollard et al. | 348/241 |
| 2006/0008171 A1 * | 1/2006 | Petschnigg et al. | 382/254 |
| 2009/0154778 A1 * | 6/2009 | Lei et al. | 382/112 |
| 2011/0044554 A1 * | 2/2011 | Tian et al. | 382/255 |
| 2011/0122226 A1 * | 5/2011 | Kamen et al. | 348/43 |

OTHER PUBLICATIONS

Agrawal et al., "Removing Photography Artifacts using Gradient Projection and Flash-Exposure Sampling", 2005, 8 pages.
Petschnigg et al., "Digital Photography with Flash and No-Flash Image Pairs", 2004, 9 pages.

* cited by examiner

*Primary Examiner* — Bhavesh Mehta
*Assistant Examiner* — Ian Lemieux
(74) *Attorney, Agent, or Firm* — Fay Sharpe LLP (57) ABSTRACT

Provided are methods and systems for generating a binarized representation of a document using a mobile device configured to provide a Flashed and No-flashed image of the document. According to an exemplary method, the Flash and No-flash images are aligned and blended, where the resulting image includes the No-flash image where any hot spots are included in the Flash image. After blending, the blended image is binarized.

20 Claims, 9 Drawing Sheets

PHOTOGRAPH

FLASH
FIG. 8

BINARIZED

FLASH
FIG. 9

PHOTOGRAPH

NO-FLASH
FIG. 10

BINARIZED

NO-FLASH
FIG. 11

PHOTOGRAPH

FUSED
FIG. 12

BINARIZED

FUSED
FIG. 13

PHOTOGRAPH

FLASH
FIG. 14

BINARIZED

FLASH
FIG. 15

PHOTOGRAPH

NO-FLASH
FIG. 16

BINARIZED

NO-FLASH
FIG. 17

PHOTOGRAPH

FUSED
FIG. 18

BINARIZED

FUSED
FIG. 19

FLASH/NO-FLASH IMAGING FOR BINARIZATION

BACKGROUND

This disclosure relates to methods and systems to generate a binarized representation of a document using a Flashed image of the document and a No-flashed image of the document.

There are many techniques for binarization of an image where the image is scanned and/or photographed. However, known techniques for binarization are not sufficient for low quality images obtained with many mobile device cameras, such as cell phones, smart phones, etc. In order to produce a better quality photograph/image using a mobile device such as a cell phone, the cell phone may be provided with a flash. However, the use of a flash to photograph a document often produces "hot spots" where the image is washed out or specular reflections from inked areas of the document produce strange results.

This disclosure provides techniques and associated exemplary embodiments thereof to produce a relatively higher quality binarization processing of a low quality image generated with a mobile device including a camera with a flash, where Flashed and No-flashed photographs of a subject are taken sequentially.

INCORPORATION BY REFERENCE

Agrawal et al., "Removing Photography Artifacts using Gradient Projection and Flash-Exposure Sampling", 2005, 8 pages; and Petschnigg et al., "Digital Photography with Flash and No-flash Image Pairs", 2004, 9 pages, are incorporated herein by reference in their entirety.

BRIEF DESCRIPTION

In one embodiment of this disclosure, described is a computer implemented method of generating a binarized representation of a document using a mobile device configured to provide a Flashed image of the document and a No-flashed image of the document, the method comprising: a) generating the Flashed image of the document with the mobile device; b) generating the No-flashed image of the document with the mobile device; c) blending the Flashed image of the document with the No-flashed image of the document to generate a blended image of the document, the blended image of the document including one or more regions associated with the Flashed image of the document and one or more regions associated with the No-flashed image of the document; and d) binarizing the blended image of the document to generate a binarized representation of the document.

In another embodiment of this disclosure, described is an image processing system comprising: a processor configured to perform a method of generating a binarized representation of a document, the method comprising: aa) accessing a Flashed image of the document, the Flashed image generated with a mobile device configured to provide a Flashed image of the document and a No-flashed image of the document; bb) accessing a No-flashed image of the document generated with the mobile device; cc) blending the Flashed image of the document with the No-flashed image of the document to generate a blended image of the document; and dd) binarizing the blended image of the document to generate a binarized representation of the document.

In still another embodiment of this disclosure, described is a computer program product comprising: a non-transitory computer-usable data carrier storing instructions that, when executed by a computer, cause the computer to perform a method of generating a binarized representation of a document, the method comprising: aa) accessing a Flashed image of the document, the Flashed image generated with a mobile device configured to provide a Flashed image of the document and a No-flashed image of the document; bb) accessing a No-flashed image of the document generated with the mobile device; cc) blending the Flashed image of the document with the No-flashed image of the document to generate a blended image of the document; and dd) binarizing the blended image of the document to generate a binarized representation of the document.

DETAILED DESCRIPTION

This disclosure provides a technique to improve the binarization of low quality images, particularly those taken with cell phone cameras. The disclosed embodiments combine a Flash and a No-flash image as a preprocessing step to provide a higher quality input to a binarization process. The Flash image is used outside the "hot spot" region, and the No-flash image is used in the specular reflection "hot spot" region. Benefits of the disclosed embodiments include improved image quality for input to a binarization process as an initial step for OCR (Optical Character Recognition) on cell phone captured images, which is advantageous for mobile digital imaging.

As briefly discussed in the background section, there are many techniques for binarization, but known techniques have problems with the kind of low quality images obtained with some mobile devices, such as cell phone cameras. Poor ambient illumination is often a key problem associated with images obtained with cell phone cameras. Many cell phone cameras have flash capability, but capturing an image using a cell phone flash often produces "hot spots" where the image is washed out, or specular reflections from the inked areas produce strange effects.

This disclosure provides methods and systems to combine a Flash and a No-flash image to provide a higher quality input for use in a binarization process. The Flash image is used outside the "hot spot" region, and the No-flash image is used in the "hot spot" region associated with the Flash image. An exemplary implementation is described that first aligns the two images, i.e. the Flash image and No-flash image, by finding a warping function that maximizes the cross-correlation between the Flash and No-flash images. The process then blends the two images together with a weighting factor that depends on the cross correlation. At pixel locations of the Flash image where the cross correlation is high, the Flash image is used. At pixel locations where the cross correlation it is low, i.e. the "hot spot", the No-flash image is used.

In other words, the process used to blend Flash and No-flash images includes:

A) use align algorithm to align No-flash image with Flash image by
1) calculating similarity measure between regions of Flash and No-flash images,
2) warping No-flash image to align similar structures in the two images; and B) use similarity measure to blend Flash and No-flash images
1) where the images are similar use Flash image,
2) where the images are dissimilar (hot spot) use No-flash image.

Doing OCR based on cell phone images is becoming common practice, but usage is limited by the poor quality of the cell phone images. The disclosed technique and exemplary embodiments provided herein improve the binarization process which is generally the first step of an OCR process.

Figure 1:
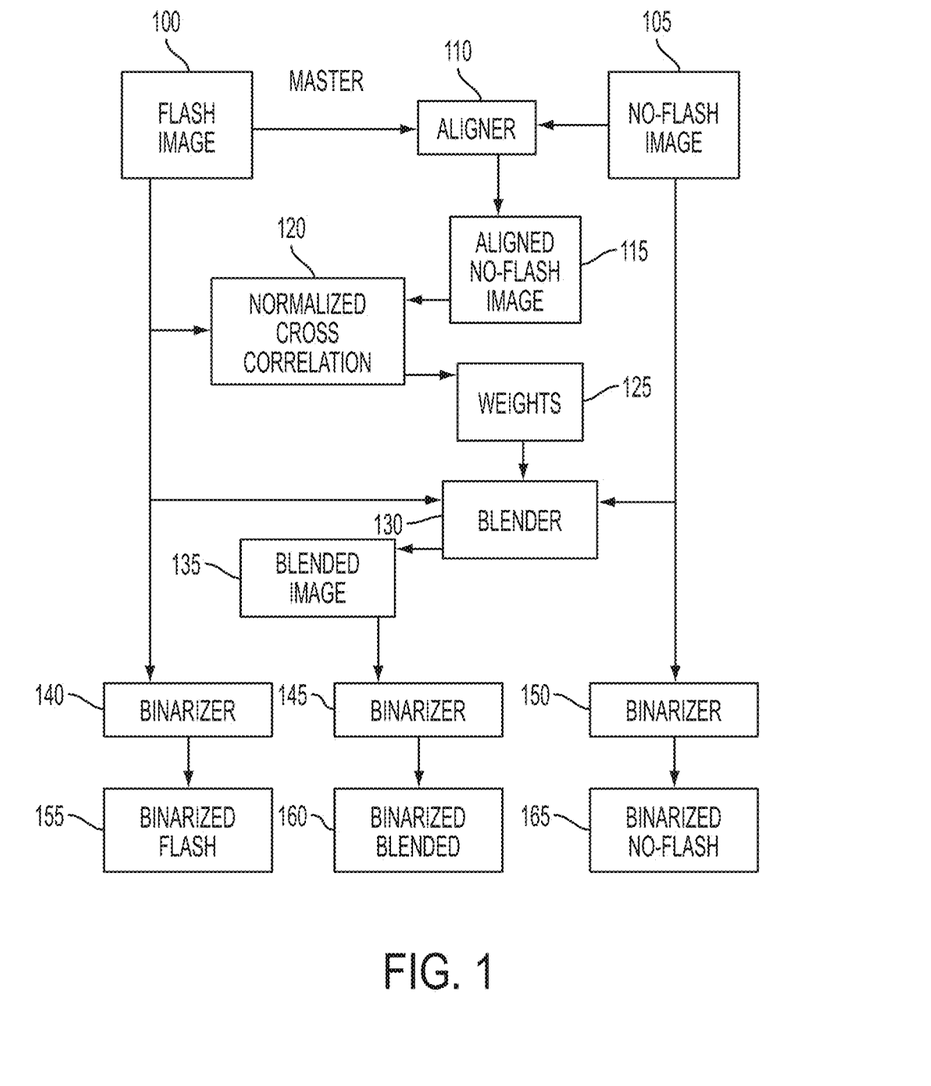
FIG. 1 is a block diagram of a method of generating a binarized representation of a document according to an exemplary embodiment of this disclosure.

With reference to FIG. 1, illustrated is a block diagram of an exemplary method of generating a binarized representation of a document using a mobile device to provide a Flashed image of the document and a No-flashed image of the document.

Initially, block 100 acquires a Flash image of the document and block 105 acquires a No-flash image of the document. It is to be understood that the Flash image and No-flash images, i.e. photographs, are temporally sequential and provided by a mobile device such as a camera phone. The user of the mobile device takes the Flash and No-flash photographs in relatively rapid succession, optimally, to minimize the relative alignment differential between the two images caused by movement of the photographer. However, as is further described below, the disclosed binarization process accounts for any misalignment of the Flash and No-flash images caused by the photographer moving the mobile device between the Flash and No-flash photographs. It is also to be understood that the document location is fixed relative to the mobile device for the exemplary embodiment of the binarization process described herein.

Block 110 provides a two dimensional alignment of the No-flash image with the Flash image to generate an aligned No-flash image at block 115. In other words, block 115 provides a No-flash image which is warped, i.e. aligned, such that the pixel locations associated with any text/images of the document are essentially identical for the Flash image and aligned No-flash image.

At block 120, a normalized cross correlation of the Flash image 100 and aligned No-flash image is performed.

Block 125 generates a weighted function based on the output of the normalized cross correlation process 120.

Block 130 blends the Flash image with the weighted aligned No-flash image to produce a blended image 135 which includes the No-flash image of the document where "hot spots" occur in the Flash image and the Flash image at all other locations.

Block 145 binarizes the blended image to produce a binarized blended image of the document 160.

As will be discussed below, for comparison purposes, block 140 and 155 generate a binarized Flash image of the document and blocks 150 and 165 generate a binarized No-flash image of the document.

Now further details of the alignment algorithm i.e. block 110, 115, 120 and 125 are provided.

Object: align test (No-flash) image with master (Flash) image, where both have some similar structures and may have differences as well.

The Object is accomplished by:
a) Splitting master image into an array of blocks, for example, 5×5 to 15×15 arrays.
b) Finding an optimum shift for each master (i.e. Flash) image block, where a maximal peak in the cross correlation between test image and shifted master block indicates an optimal shift.
c) Fitting a quadratic warping function to the optimal shift data associated with the array of blocks; where:
$S = F(X, W)$, and
X is position in unshifted master image,
S is shift to corresponding point in test image, and
W are the parameters of the warping function.
d) Applying warping function to test image to align it with the master image.

Figure 2:
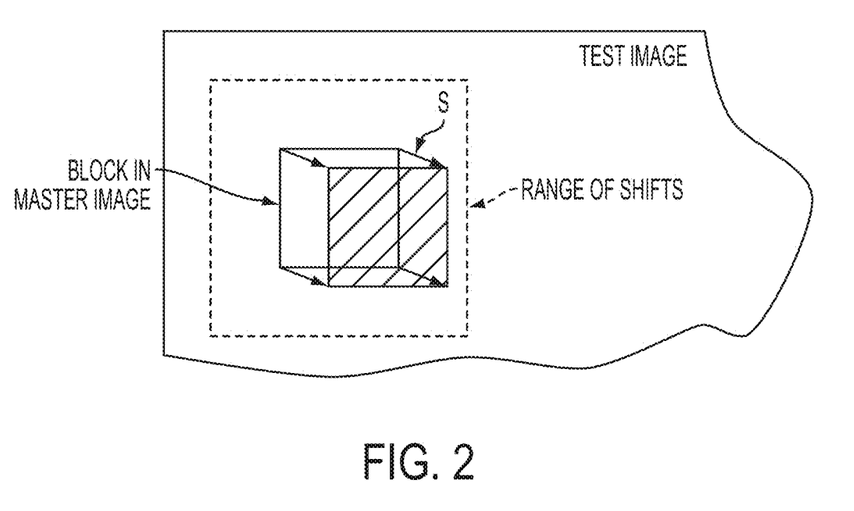
FIG. 2 shows the range of shifts associated with a master image block and test image block when performing cross correlation according to an exemplary embodiment of this disclosure.

With reference to FIG. 2, illustrated is an exemplary cross correlation process represented as follows:
$CC(S) = \Sigma_x V_m(X) V_t(X+S)/N$, where $CC(S)$ is a cross-correlation as a function of shift S, $V_m(X)$ represents a pixel value of the master image at pixel location X, $V_t(X+S)$ represents a pixel value of the test image at pixel location X+S, and N is the number of pixels in the block;
$P_m = \Sigma_x V_m(X) V_m(X)/N$ where $P_m$ represents the average power ($V^2$) of the master image pixel values $V_m(X)$;
$P_t(S) = \Sigma_x V_t(X+S) V_t(X+S)/N$ where $P_t(S)$ represents the average power ($V^2$) of the test image pixel values $V_t(X+S)$ at their respective shifted locations;
$Norm(S) = sqrt(P_m P_t(S))$ is a normalization function; and
$NCC(S) = CC(S)/Norm(S)$ is a normalized cross correlation function.
A useful characteristic of NCC is that if $V_m(X) = K V_t(X+S_c) + D$, then $NCC(S_c) = 1.0$, where K and D are constants.

Figure 3:
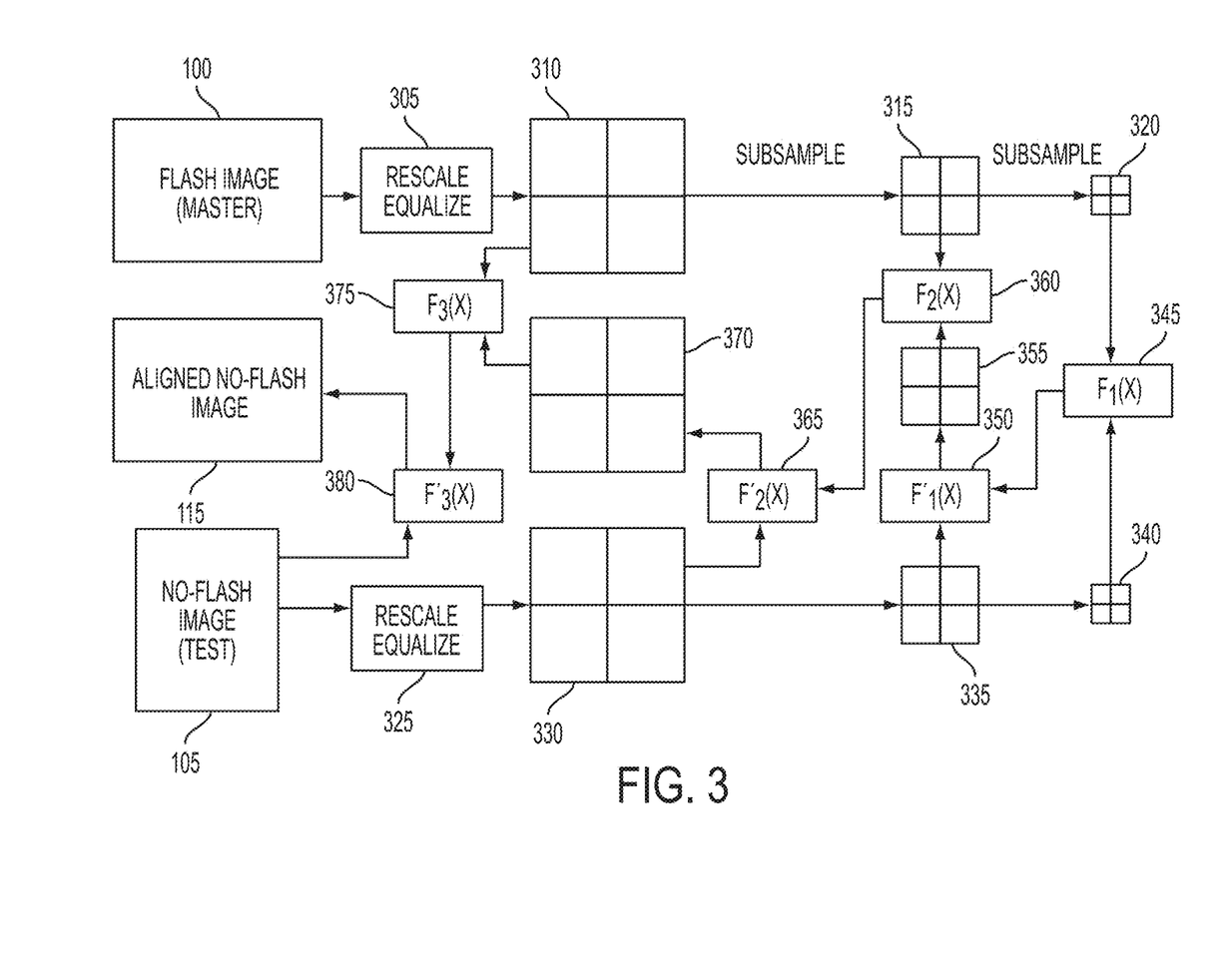
FIG. 3 is a block diagram of an alignment process according to an exemplary embodiment of this disclosure.

With reference to FIG. 3, described now are further details of the alignment process described hereto, the alignment process including the generation of a polynomial warping function $F'_3(X)$ 380 which is applied to the test image 105 to produce an aligned test image, i.e. No-flash image 115, by splitting the master image 100 into an array of blocks and finding an optimum shift for each image block, relative to the test image. As previously discussed, a peak in the cross-correlation between the test image and the shifted master block indicate an optimal shift.

Initially, block 305 and block 325 rescale the Flashed image and No-flash image, respectively, to generate a consistently sized Flash and No-flash image prior to subsampling, i.e. block generation. To compensate for the difference in illumination, dynamic range equalization is also done, for example by histogram equalization.

After the Flash and No-flash images are rescaled, block 310 generates an array of blocks at 50% of the resolution of the original Flash image. Notably, the array of blocks shown in FIG. 3 are 2×2 arrays, however, the size of the array is not limited to a particular size. For example, 5×5 to 15×15 arrays provide satisfactory results, and other sizes are within the scope of this disclosure.

Block 315 generates another array of blocks at 50% of the resolution of the blocks generated at block 310, and block 320 generates a third array of blocks at 50% of the resolution of the blocks generated at block 315.

Similarly, blocks 330, 335, and 340 step down the resolutions of the original No-flash image in 50% decrements to product arrays of blocks similarly sized to the arrays of blocks generated in 310, 315, and 320 for the Flash image.

At block 345, a warping function $F_1(X)$ is generated to align Flash image blocks 320 and No-flash image blocks 340. This alignment of the subsample of reduced resolution blocks provides a relatively course alignment of the Flash and No-flash images which has the benefit of being fast relative to initially generating a warping function based on the full resolution Flash and No-flash images 100 and 105 respectively.

At block 350, warping function $F'_1(X)$ aligns No-flash image reduced resolution block 335 based on $F_1(X)$ and produces an aligned No-flash image at the reduced resolution associated with block 335.

Block 360 generates a second warping function $F_2(X)$ which aligns Flash image reduced resolution blocks 315 with the array of blocks generated in block 355.

Next, block 365 performs an alignment of the No-flash image array of blocks at the resolution at the resolution of block 330 to generate an aligned array of blocks representative of the No-flash image at the resolution of the block array associated with block 330, i.e. 50% of the original No-flash image.

Block 375 generates a third warping function $F_3(X)$ which aligns Flash image 50% reduced resolution blocks 310 with the array of blocks generated in block 370.

Finally, block 380 generates an aligned full resolution No-flash image warping the No-flash image using the warping function $F'_3(X)$ stepped up in resolution to the resolution of the original No-flash image and Flash image.

As will be understood by those of skill in the art after reading this disclosure, by rescaling and subsampling images at reduced resolution as previously described, the process speed of generating a warping function is increased, relative to generating a warping function at the full resolutions of the original Flash and No-flash images. Obviously, if process speed is not a concern, decrementally reducing the resolutions of the Flash and No-flash images is not required.

Figure 4:
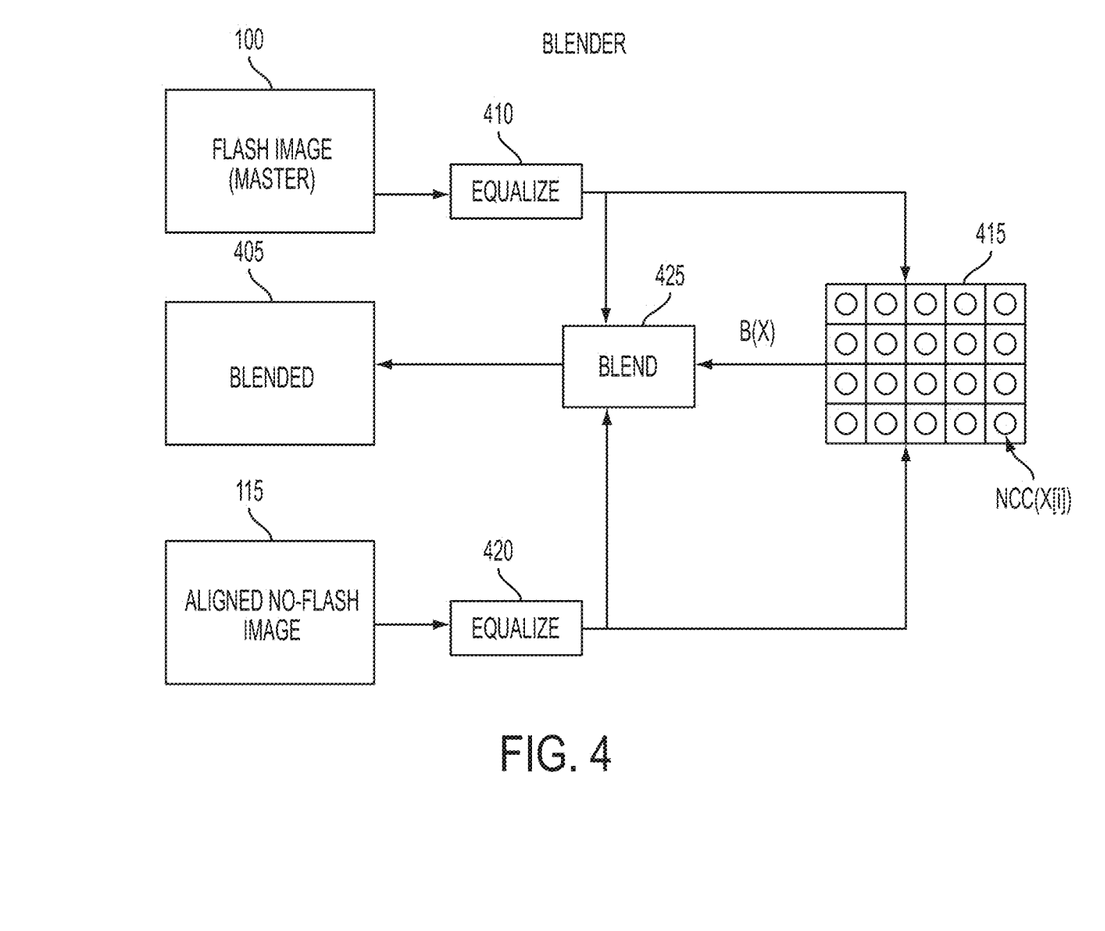
FIG. 4 is a block diagram of a blending process according to an exemplary embodiment of this disclosure.

With reference to FIG. 4, illustrated is the process of blending the Flash image 100 and aligned No-flash image 115, the aligned No-flash image 115 generated as described with reference to FIG. 3.

Blocks 410 and 420 equalize the Flash image and No-flash image, respectively, to generate Flash and No-flash images with consistent dynamic ranges prior to blending.

Block 425 blends the equalized Flash image with the equalized No-flash image as a function of NCC(X[i]) 415, which is the normalized cross correlation of the Flash image and aligned No-flash image to produce a blended image.

The blending function uses primarily the Flash image for regions not including the hot spot associated with the flash, that is where NCC (normalized cross correlation) is relatively high, and the blending function uses No-flash image for regions associated with the hot spot, that is where NCC is relatively low.

In one embodiment, a real-valued weight factor w that is directly proportional to NCC and lying within the range of 0 to 1 is first defined. For example, w can be a power-law function of NCC, where $w=NCC^p$ and p is a positive real-valued number. The flash and no-flash images are then blended according to the formula:

$$I_b = w*I_f + (1-w)*I_{nf}$$

where $I_f$ is the flashed image, $I_{nf}$ is the no-flash image, and $I_b$ is the blended image. It is to be understood that more complicated relationships between the normalized cross correlation and the weight factor can be implemented and are within the scope of this disclosure. Furthermore, additional variants of the blending function that incorporate additional factors such as the signal power in the Flash and aligned No-flash image are comprehended.

Figure 5:
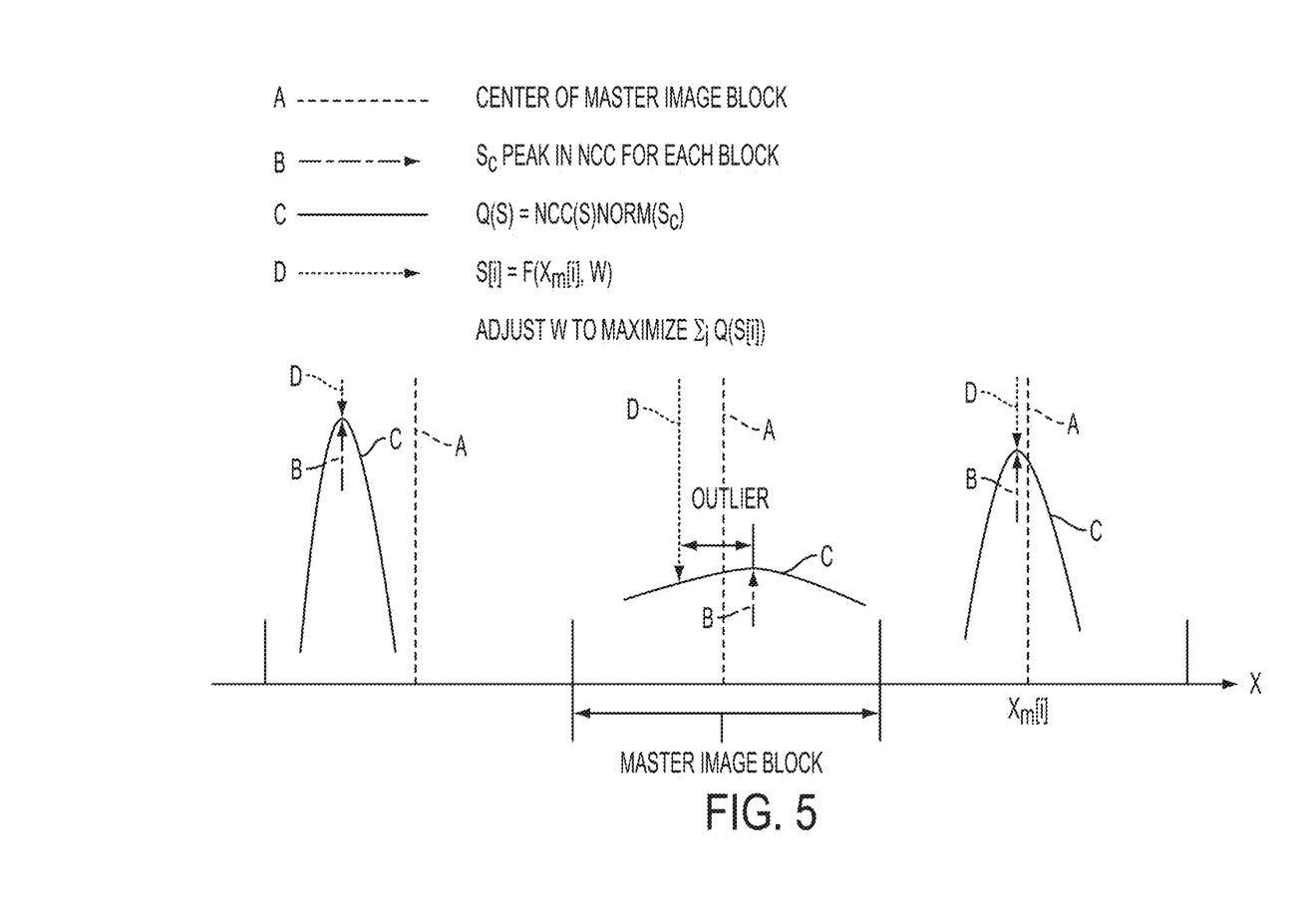
FIG. 5 shows the fitting of a Warping Function according to an exemplary embodiment of this disclosure.

FIG. 5 illustrates an exemplary process for fitting a warping function, as previously described, by generating a weighted polynomial warping function to provide an aligned image. In this diagram we consider the fitting process for one of the two spatial coordinates of the image. Three adjacent blocks of the master image are shown. Each "B" arrow is drawn at the peak of the normalized cross correlation between each master image block and the corresponding shifted block in the test image. The displacement of the "B" arrow from dashed line "A" at the center of the master image block is the optimum shift $S_c$. Line "C" is the function Q(S) which is the product of the normalization function, $Norm(S_c)$, and the normalized cross correlation. The height of Q(S) is therefore proportional to the signal power in the block, and its sharpness is determined by the sharpness of the features in the block. If there are many sharp lines in the block, the normalized cross correlation will fall off very quickly as S moves away from $S_c$. If, on the other hand, the block contains only soft features (a blob of color with soft edges), the normalized cross correlation will not fall off very quickly as S moves away from $S_c$.

The "D" arrows show the shifts predicted by the polynomial warping function, F(X, W), for X values at the center of the master image blocks, $X_m[i]$, given the polynomial warping function parameter vector W. We adjust W to maximize $\Sigma_i Q(S[i])$. The fitting process therefore gives more weight to blocks with high signal power and sharp features, which is a desirable characteristic. In the case illustrated, S[i] in the middle block is so far from the corresponding $S_c$ for that block, it will be considered an outlier. We will therefore re-maximize $\Sigma_i Q(S[i])$, leaving this block out of the summation.

FIGS. 6-19 are examples of a Flash/No-flash binarization process as described herein.

Figure 6:
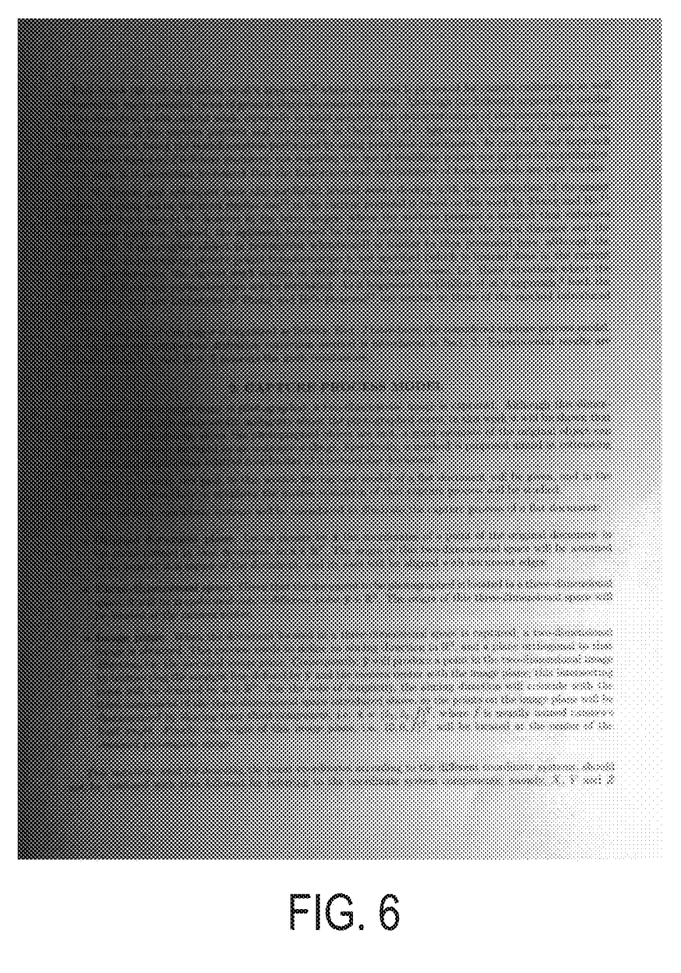
FIG. 6 is an example of a No-flash image of a document.
Figure 7:
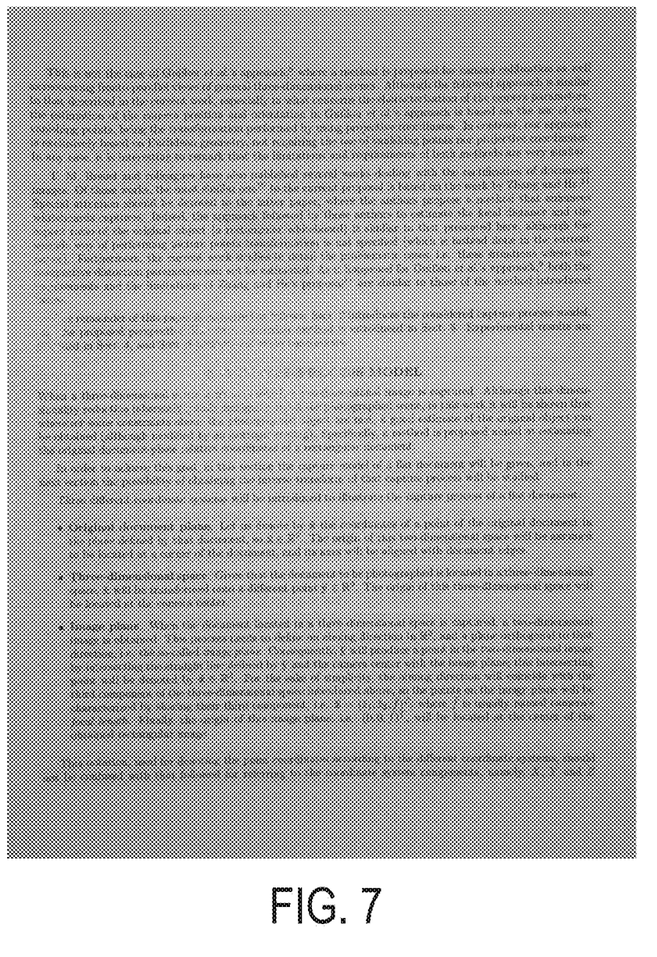
FIG. 7 is an example of a Flash image of the same document shown in FIG. 6.

FIG. 6 is an example of a No-flash image of a document captured with a mobile phone camera. FIG. 7 is an example of a Flash image of the same document shown in FIG. 6.

Figure 8:
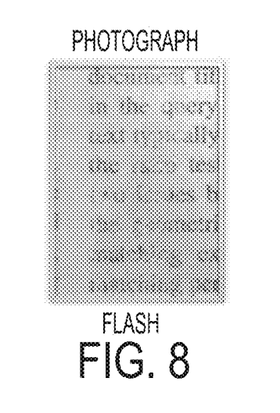
FIG. 8 shows Region A of the Flash photograph of the example document shown in FIG. 7.

FIG. 8 shows Region A of the Flash photograph of the example document shown in FIG. 7, Region A including a hot spot region.

Figure 9:
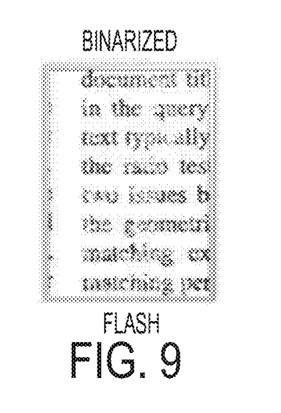
FIG. 9 is a binarized representation of Flash Region A shown in FIG. 8.

FIG. 9 is a binarized representation of Flash Region A shown in FIG. 8.

Figure 10:
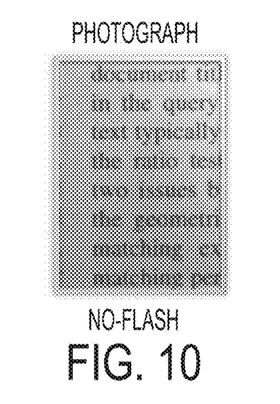
FIG. 10 shows Region A of the No-flash photograph of the example document shown in FIG. 6.
Figure 11:
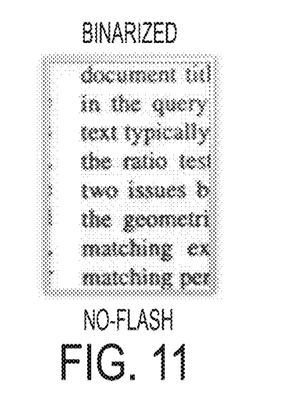
FIG. 11 is a binarized representation of No-flash Region A shown in FIG. 10.

FIG. 10 shows Region A of the No-flash photograph of the example document shown in FIG. 6. FIG. 11 is a binarized representation of No-flash Region A shown in FIG. 10.

Figure 12:
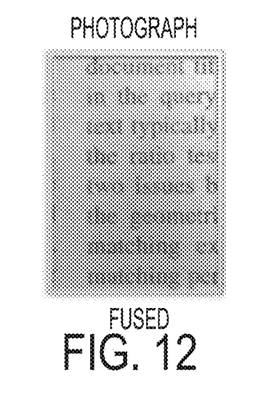
FIG. 12 shows a fused image of Region A including pixels associated with Flash Region A (FIG. 8) and No-flash Region A (FIG. 10).
Figure 13:
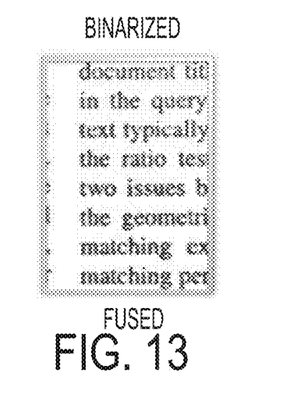
FIG. 13 is a binarized representation of FIG. 12.

FIG. 12 shows a fused, i.e. blended, image of Region A including pixels associated with Flash Region A (FIG. 8) and No-flash Region A (FIG. 10), the fused image generated according to the Flash/No-flash image processing algorithm described herein. FIG. 13 is a binarized representation of FIG. 12.

Figure 14:
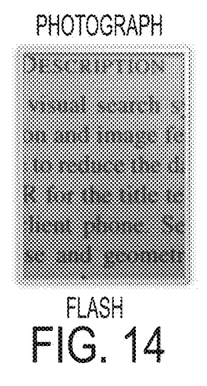
FIG. 14 shows Region B of the Flash photograph of the example document shown in FIG. 7.
Figure 15:
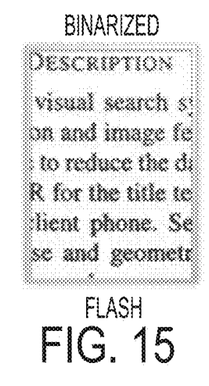
FIG. 15 is a binarized representation of Flash Region B shown in FIG. 14.

FIG. 14 shows Region B of the Flash photograph of the example document shown in FIG. 7, where Region B does not include a hot spot. FIG. 15 is a binarized representation of Flash Region B shown in FIG. 14.

Figure 16:
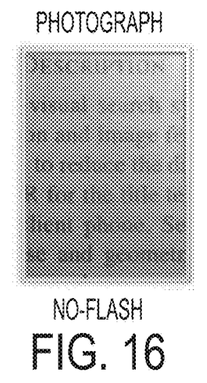
FIG. 16 shows Region B of the No-flash photograph of the example document shown in FIG. 6.
Figure 17:
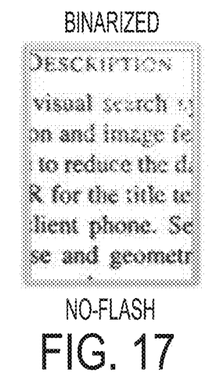
FIG. 17 is a binarized representation of No-flash Region B shown in FIG. 16.

FIG. 16 shows Region B of the No-flash photograph of the example document shown in FIG. 6. FIG. 17 is a binarized representation of No-flash Region B shown in FIG. 16.

Figure 18:
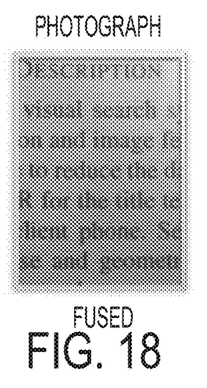
FIG. 18 shows a fused image of Region B including pixels associated with Flash Region B (FIG. 14) and No-flash Region B (FIG. 16).
Figure 19:
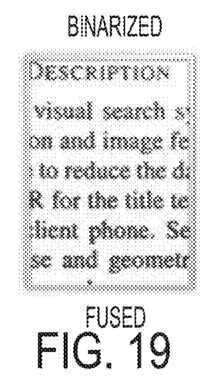
FIG. 19 is a binarized representation of FIG. 18.

FIG. 18 shows a fused, i.e. blended, image of Region B including pixels associated with Flash Region B (FIG. 14) and No-flash Region B (FIG. 16). FIG. 19 is a binarized representation of FIG. 18.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer implemented method of generating a binarized representation of a document using a mobile device configured to provide a Flashed image of the document and a No-flashed image of the document, the method comprising:
   a) generating the Flashed image of the document with the mobile device;
   b) generating the No-flashed image of the document with the mobile device;
   c) blending the Flashed image of the document with the No-flashed image of the document to generate a blended image of the document, the blended image of the document including one or more regions associated with the Flashed image of the document and one or more regions associated with the No-flashed image of the document; and d) binarizing the blended image of the document to generate a binarized representation of the document,
wherein step c) includes:
c1) generating an aligned No-flashed image of the document, the aligned No-flashed image generated by aligning the No-flashed image of the document with the Flashed image of the document by applying a warping function to the No-flashed image to align it with the Flashed image, the warping function generated by iteratively generating one or more other warping functions associated with aligning the No-flashed image of the document at a reduced resolution and the Flashed image of the document at the reduced resolution; and
c2) blending the aligned No-flashed image of the document with the Flashed image of the document to generate a blended image of the document.

2. The computer implemented method according to claim 1, wherein the warping function is a quadratic warping function.

3. The computer implemented method according to claim 1, step c1) comprising:
c1 a) partitioning the Flashed image into an array of blocks,
c1 b) generating an optimum shift vector for each Flashed image block relative to the No-flashed image;
c1 c) generating a warping function fitted to the optimum shift vectors generated in step c1b); and
c1 d) applying the warping function to the No-flashed image to align it with the Flashed image to generate an aligned No-flash image of the document.

4. The computer implemented method according to claim 3, wherein a peak in a cross correlation function applied to the Flashed image block and the No-flash image is associated with an optimum shift vector for each Flashed image block.

5. The computer implemented method according to claim 1, step c2) comprising:
c2a) generating a cross correlation function of the aligned No-flashed image relative to the Flashed image; and
c2b) blending the aligned No-flash image of the document with the Flashed image of the document to generate a blended image of the document, according to the formula:

$$I_b = w * I_f + (1-w) * I_{nf},$$

where $I_f$ is the flashed image, $I_{nf}$ is the no-flash image, w is a weighting factor, and $I_b$ is the blended image, and where w is directly proportional to the cross-correlation function.

6. The computer implemented method according to claim 5, where w is a power of a normalized cross correlation function given by $w = NCC^P$ where NCC is the normalized cross correlation function and p is a positive real-valued number.

7. The computer implemented method according to claim 1, wherein step c) comprises:
c1 a') generating an aligned Flashed image of the document, the aligned Flashed image generated by aligning the Flashed image of the document with the no-flashed image of the document; and
c2b') blending the aligned Flashed image of the document with the No-flashed image of the document to generate a blended image of the document.

8. The computer implemented method according to claim 1, wherein the Flashed image includes a hot spot region associated with a high illumination by a flash associated with the mobile device, relative to other regions of the Flashed image; and step c) comprises:
blending the Flashed image of the document with the No-flashed image of the document to generate a blended image of the document, the blended image of the document including the Flashed image of the document outside the hot spot region and the No-flashed image of the document in a region of the blended image associated with the hot spot region.

9. The computer implemented method according to claim 1, wherein the Flashed image of the document generated in step a) and the No-flashed image of the document generated in step b) are contone images.

10. The computer implemented method according to claim 1, wherein the binarized blended image is further processed using an OCR (Optical Character Recognition) process.

11. An image processing system comprising:
a processor configured to perform a method of generating a binarized representation of a document, the method comprising:
aa) accessing a Flashed image of the document, the Flashed image generated with a mobile device configured to provide a Flashed image of the document and a No-flashed image of the document;
bb) accessing a No-flashed image of the document generated with the mobile device;
cc) blending the Flashed image of the document with the No-flashed image of the document to generate a blended image of the document; and
dd) binarizing the blended image of the document to generate a binarized representation of the document,
where step cc includes:
cc1) generating an aligned No-flashed image of the document, the aligned No-flashed image generated by aligning the No-flashed image of the document with the Flashed image of the document by applying a warping function to the No-flashed image to align it with the Flashed image, the warping function generated by iteratively generating one or more other warping functions associated with aligning the No-flashed image of the document at a reduced resolution and the Flashed image of the document at the reduced resolution; and
cc2) blending the aligned No-flashed image of the document with the Flashed image of the document to generate a blended image of the document.

12. The image processing system according to claim 11, step cc1) comprising:
cc1a) partitioning the Flashed image into an array of blocks, Cc1 b) generating an optimum shift vector for each Flashed image block relative to the No-flashed image;
cc1c) generating a warping function fitted to the optimum shift vectors generated in step cc1b); and
cc1d) applying the warping function to the No-flashed image to align it with the Flashed image to generate an aligned No-flash image of the document.

13. The image processing system according to claim 12, wherein a peak in a cross correlation function applied to the Flashed image block and the No-flash image is associated with an optimum shift vector for each Flashed image block.

14. The image processing system according to claim 11, step cc2) comprising:
cc2a) generating a cross correlation function of the aligned No-flashed image relative to the Flashed image; and
cc2b) blending the aligned No-flash image of the document with the Flashed image of the document to generate a blended image of the document, according to the formula:

$$I_b = w * I_f + (1-w) * I_{nf},$$

where $I_f$ is the flashed image, $I_{nf}$ is the no-flash image, w is a weighting factor, and $I_b$ is the blended image, and where w is directly proportional to the cross correlation function.

15. The image processing system according to claim 11, wherein step cc) comprises:
   cc1 a') generating an aligned Flashed image of the document, the aligned Flashed image generated by aligning the Flashed image of the document with the no-fleshed image of the document; and
   cc2b') blending the aligned Flashed image of the document with the No-flashed image of the document to generate a blended image of the document including one or more regions associated with the Flashed image of the document and one or more regions associated with the No-flashed image of the document.

16. The image processing system according to claim 11, wherein the Flashed image includes a hot spot region associated with a high illumination by a flash associated with the mobile device, relative to other regions of the Flashed image; and
   step cc) comprises:
      blending the Flashed image of the document with the No-flashed image of the document to generate a blended image of the document, the blended image of the document including the Flashed image of the document outside the hot spot region and the No-flashed image of the document in a region of the blended image associated with the hot spot region.

17. The image processing system according to claim 11, wherein the Flashed image of the document generated in step aa) and the No-flashed image of the document generated in step bb) are contone images.

18. The image processing system according to claim 11, wherein the binarized blended image is further processed using an OCR (Optical Character Recognition) process.

19. A computer program product comprising:
   a non-transitory computer-usable data carrier storing instructions that, when executed by a computer, cause the computer to perform a method of generating a binarized representation of a document, the method comprising:
   aa) accessing a Flashed image of the document, the Flashed image generated with a mobile device configured to provide a Flashed image of the document and a No-flashed image of the document;
   bb) accessing a No-flashed image of the document generated with the mobile device;
   cc) blending the Flashed image of the document with the No-flashed image of the document to generate a blended image of the document; and
   dd) binarizing the blended image of the document to generate a binarized representation of the document,
   where step cc includes:
   cc1) generating an aligned No-flashed image of the document, the aligned No-flashed image generated by aligning the No-flashed image of the document with the Flashed image of the document by applying a warping function to the No-flashed image to align it with the Flashed image, the warping function generated by iteratively generating one or more other warping functions associated with aligning the No-flashed image of the document at a reduced resolution and the Flashed image of the document at the reduced resolution; and
   cc2) blending the aligned No-flashed image of the document with the Flashed image of the document to generate a blended image of the document.

20. The computer program product according to claim 19, wherein step cc) comprises:
   cc1) generating an aligned Flashed image of the document, the aligned Flashed image generated by aligning the Flashed image of the document with the no-fleshed image of the document; and
   cc2) blending the aligned Flashed image of the document with the No-flashed image of the document to generate a blended image of the document.

* * * * *